United States Patent [19]
van Putten et al.

[11] Patent Number: 5,426,969
[45] Date of Patent: Jun. 27, 1995

[54] METHOD FOR DRIFT ELIMINATION IN SENSORS

[76] Inventors: Mauritius H. P. M. van Putten, I.T.P. at UCSB, Santa Barbara, Calif. 93106; Michel J. A. M. van Putten, Anmar Ingenieursbureau B.V., Aquariuslaan 62, 5632BD Eindhoven, Netherlands; Antonius F. P. van Putten; Pascal F. A. M. van Putten, both of Aquariuslaan 62, 5632BD Eindhoven, Netherlands

[21] Appl. No.: 199,538

[22] Filed: Feb. 22, 1994

[30] Foreign Application Priority Data

Dec. 8, 1993 [NL] Netherlands ............... 9301399

[51] Int. Cl.⁶ ............................................. G01F 25/00
[52] U.S. Cl. ................................................... 73/3
[58] Field of Search .............. 73/1 B, 1 D, 3, 4 R, 73/23.21, 497, 708, 766, 862.623, 861.02

[56] References Cited

U.S. PATENT DOCUMENTS 3,996,799  12/1976  van Putten .
4,548,077  10/1985  van Putten .

OTHER PUBLICATIONS

Full additive drift elimination in vector sensors using the Alternating Direction Method (ADM), M. J. A. M. van Putten, M. H. P. M. van Putten, A. F. P. van Putten. submitted to Sensors & Actuators. 24 Dec. 1993.

*Primary Examiner*—Hezron E. Williams
*Assistant Examiner*—Daniel S. Larkin

[57] ABSTRACT

A method is described which enables full drift elimination in sensors, whose sensitivity to a quantity S depends on their relative orientation to the medium in which S is measured. The method defines each measurement as the difference of the results of two partial measurements, said partial measurements being obtained by said sensor in succession and with two different relative orientations between sensor and medium, said relative orientations corresponding to two distinct sensitivities to S. This Alternating Direction Method applies in particular to flow sensors, and enables accurate long-time volume measurement.

3 Claims, 1 Drawing Sheet

METHOD FOR DRIFT ELIMINATION IN SENSORS

SUMMARY

In the real-world application of sensors drift often forms the limiting factor in the performance of the sensor. In particular, additive drift tends to constitute the limiting factor in sensitivity and dynamic range, rather than noise.

The invention offers a means of operation which fully eliminates additive drift in vector sensors. The invention is exemplified in its application to flow sensors, in which case a dynamic range of 1000 is obtained, well is excess of what is feasible by standard flow metering techniques.

BACKGROUND OF THE INVENTION

The invention provides a method for the elimination of drift in vector sensors. To set notation, a vector sensor is understood to be measuring a physical vectorial quantity S in an input energy domain $D_i$ by converting S into a signal in an output energy domain $D_o$. In particular, we think here of electric or electronic sensors for the measurement of gas flow or pressure. Thus, sensors are seen to simultaneously possess a state A in the input energy domain $D_i$ and a state B in the output energy domain $D_o$.

The new method of operation concerns the real-world application of sensors in the presence of imperfections. Imperfections are generally present in both the sensor itself and, in the case of active sensors, in the biasing of the sensor and its output amplifiers. While ideal sensors as abstract devices possess zero sensitivity for physical quantities other than S, sensors in the real-world possess imperfections due to technological limitations and, consequently, possess finite sensitivity for quantities other than S. Errors in the measurement of S due to finite sensitivity to quantities other than S are manifest in the form of offset with unpredictable behavior. The resulting drift in offset persists additively as drift in the output signal, when the input signal, S, is kept constant. Typically, the resulting offset is predominant over noise, i.e., S/offset < <S/noise, so that offset defines the lowest limit at which S can be reliably measured. In other words, offset typically determines the dynamic range of the sensor at hand, rather than noise. We remark that drift in the sensitivity of a sensor to its measurand S does not influence the dynamic range of the sensor. For this reason, only the forementioned drift in offset, i.e., additive drift is considered here.

The current approach towards elimination of drift is taken by a continuous effort towards ever more precise manufacturing processes. In particular, modern manufacturing processes involve special correction techniques such as laser trimming, with which imperfections resulting from the basic production process are greatly reduced. In such approach, the final performance of the sensor is determined by the quality of the overall production process. With our new method, proposed below, technological limitations are of secondary importance.

SUMMARY OF THE INVENTION

The new method is proposed for elimination of drift. The method applies to sensors with directional sensitivity, i.e., anisotropic sensitivity in two or more directions. Sensors of this type are also known as vector sensors. Sensors with this property define an orientation with respect to which S is measured.

An example of a vector sensor is given by the flow sensor by A.F.P. van Putten (U.S. Pat. Nos. 4,548,077 and 3,996,799), where the gas flow velocity, S, induces a thermal gradient (a vectorial quantity) in a silicon integrated chip. This silicon flow sensor is heated electrically, and obtains temperature gradients in the presence of gas flow. An integrated Wheatstone bridge reads off the temperature gradient induced by such flow.

The new method defines a single measurement through two partial measurements obtained from the same sensor in succession with different sensor states A in the input energy domain $D_i$. In the presence of directional sensitivity the two different sensor states A can be realised through two different relative orientations between sensor and medium. Thus, in the new method the forementioned two partial measurements are obtained by successively changing the relative orientation of the sensor with respect to the medium, which relative orientations are precisely those that possess different sensitivities to the physical quantity S. In the new method, which we shall refer to as the Alternating Direction Method (ADM), the final measurement result is defined as the difference between tile two results from the two partial measurements. We shall refer to the output signal thus obtained as the ADM signal. Because in ADM each output signal is calculated from two sensor measurements, we refer to the physical, sensor measurements as partial measurements. We conclude that a sensor which discriminates between S and. quantities other than S which may interfere with the measurement of S, in the sense that the sensor possesses forementioned directional sensitivity to S, while its sensitivity is independent of direction to quantities other than S which may interfere with measurement of S, offers an ADM signal which contains no drift.

ADM APPLIED TO GAS VOLUME MEASUREMENT

The power of ADM can be exemplified in gas volume measurement using the flow sensor as described in forementioned U.S. patents. As an abstract device this sensor is bidirectional in the sense that the sign of the electric output signal due to the flow velocity S changes with rotation of the sensor over 180° (as described by M.H.P.M. van Putten in U.S. patent application Ser. No. 127,424) or 90° (as described in forementioned U.S. Pat. Nos. 4,548,077 and 3,996,799) relative to the flow direction. In the manufacturing process of these sensors asymmetries occur in the order of a few percent. A realistic measurement, therefore, represents not only the temperature gradient over the sensor, that is, the bidirectional signal, but contains a component as function of the total dissipation as well. Drift in the offset as a function of temperature, humidity, age etc., deteriorates the measurement signal in practice mainly through a change in the total dissipation, and, consequently, is independent of relative orientation between sensor and flow medium (a common mode signal in the flow medium). The said bidirectional flow sensor, therefore, offers the unique possibility for elimination of drift in offset through application of ADM. This may be made more precise in gas volume measurement as follows.

In gas volume measurement with ADM we integrate the electric output signal of the sensor, V, as induced by the flow velocity S, over consecutive time intervals $0 < t_1 < t_2 < \cdots < t_k < t_{k+1} < \ldots$ with $t_{k+1} - t_k \equiv \Delta t$. Introducing the quantity $q_k$ the measured volume over the time-interval $t_k - t_{k-1}$ with flow over the sensor alternating with 180° (90°) relative orientation, then we have $$q_k := \int_{t_{k-1}}^{t_k} V dt = (-1)^k \int_{t_{k-1}}^{t_k} V_{flow} dt + \int_{t_{k-1}}^{t_k} V_{drift} dt. \tag{1}$$

Here, we have written the output signal as it is composed of the pure $V_{flow}$ and the undesired drift, $V_{drift}$. The ADM volume, $Q_n^{ADM}$, is now given by $$Q_n^{ADM} := \Sigma_k (-1)^k [q_k - q_{k-1}] = \int_0^{t_n} V_{flow} dt + \epsilon_{n,\Delta t} \tag{2}$$

with ADM remainder $$\epsilon_{n,\Delta t} := \Sigma_k (-1)^k \int_{t_{k-1}}^{t_k} V_{drift} dt. \tag{3}$$

The ADM remainder has the property that $$\epsilon_{n,\Delta t} \sim \int_{t_{n-1}}^{t_n} V_{drift} dt - \int_0^{t_1} V_{drift} dt \tag{4}$$

in the limit as $\Delta t \to 0$ with $t_n$=const. ADM eliminates, therefore, undesired contributions due to drift in offset in gas volume measurement up to a remainder in the order of $2 \Delta t V_{drift}$.

SURVEY OF DRAWINGS

Application of ADM in gas flow measurement is illustrated by two following two implementations.

First possible implementation. FIG. 1 shows an implementation of a gas volume meter, in which the two different relative orientations between sensor S and medium are obtained through successively changing the flow direction of the medium as it passes through a measurement section M with fixed sensor holder H. To this end, a gas flow switching unit is required which alternates the direction of the gas flow using two flow switches, SL en SR. Counter clockwise (clockwise) flow is obtained by opening L1 (L2) and R1 (R2) for gas flow entering HL and HR, respectively, with L2 (L1) and R2 (R1) in closed position. Gas flow counter clockwise is obtained via the T-elements TL and TR, which connect the measurement section M with the switches SL and SR, respectively. Gas flow clockwise is obtained through the two connections BL and BR, connections between the T-elements TL and TR, which are connected to the measurement section M, and switches SR en SL, respectively.

Operation of this flow switching set-up alternatingly clockwise and counter clockwise results in two relative orientations between sensor and flow medium which differ by 180°.

ADM can now be applied to the sensor as described in forementioned U.S. patents with 180° bidirectional sensitivity, by obtaining two partial measurements from successively clockwise and counter clockwise flow directions. Second possible implementation. FIG. 2 shows an implementation of a gas flow meter, in which the two different relative orientations between sensor red flow medium are obtained by alternatingly setting the sensor in two different positions in a measurement section M with fixed flow direction (from the left to the right in FIG. 2). To this end, a rotational unit, D, is required, in which the sensor holder H, as in FIG. 1, now changes position alternatingly by 180° from Position 1 (2) to Position 2 (1). With forementioned installation of the sensor ADM can now be applied, by obtaining two partial measurements in the alternating sensor positions 1 and 2, such as indicated in the 'boxed' subfigure.

Tests have shown that with ADM the forementioned flow sensor yields a dynamic range up to three decades of flow velocity, from 1 cms$^{-1}$ to 10 ms$^{-1}$ in the presence of reproducibility better than 1%. With this new method of operation, measurements are made possible which go beyond those feasible with current techniques (other than laser-doppler flow metering techniques).

DESCRIPTION OF PREFERRED EMBODIMENTS

Figure 1:
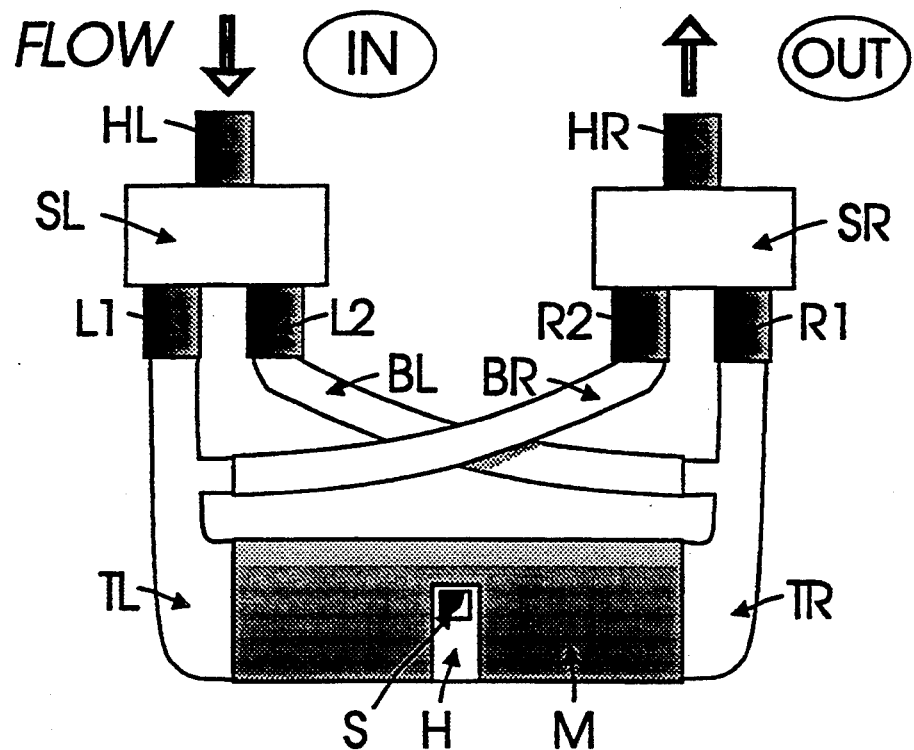
Figure 2:
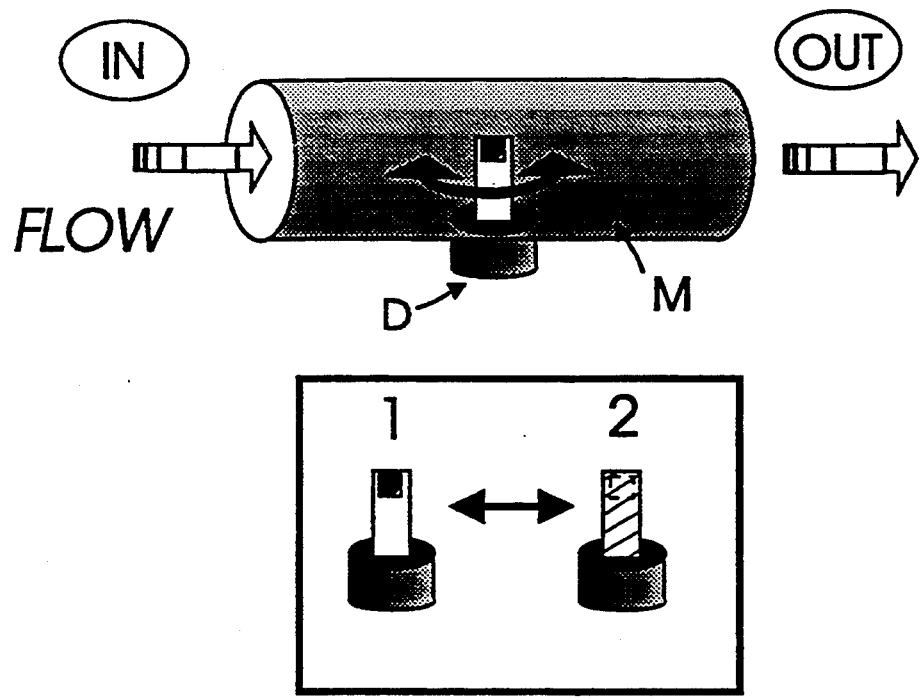

Referring more specifically to the drawings, for illustrative purposes the present invention is embodied in each of the two apparatus generally shown in FIG. 1 and FIG. 2. It will be appreciated that the embodiment of the invention may vary as to the particular sensor and as to the details of the parts without departing from the basic concepts as disclosed herein.

Referring to FIG. 1, the flow switch SL(SR) possesses three opening pipes for gas flow: with two positions SL(SR) connects either the pipe opening HL(HR) with pipe opening L1(R1) or HL(HR) with pipe opening L2(R2). The pipe openings L1 and R1 are each connected to a T-pipe elements TL and TR, respectively. The pipe openings L2 and R2 are each connected to pipes BL and BR, respectively, which are in turn connected to forementioned T-elements TR and TL, respectively.

The three pipe openings in each of the switches SL and SR, the pipes BL and BR, and the T-elements TL and TR all have inner diameters preferably, though not necessarily, sufficiently large to ensure flow throughput with a low amount of friction (at the expected flow rate), and therefore a, low amount of pressure drop across the apparatus as measured over the input HL at the input pipe of switch SL and the output HR at the output pipe of switch SR. The pipes BL, BR and T-elements TL, TL are made of durable material. The measuring section M is made of a pipe with inner diameter sufficiently large to allow uninhibited flow over the holder H with sensor S. The sensor S may be the silicon flow sensor as described in U.S. Pat. No. 4,548,077, or any other sensor with allows for 180° directional sensitivity. The sensor is mounted on a holder H, which is made out of thermally insulating material with electrical connections on it for interconnection between the sensor itself and the outside world.

Referring to FIG. 2, the measuring section is made of a pipe with inner diameter sufficiently large to allow uninhibit, ed flow through-put (at the expected flow rate), with preferably low amount of pressure drop across the input at the left and the output at the right. The measuring section M contains the switching unit D which enables rotation of the holder H with sensor S, as described in FIG. 1, alternatingly in the two positions 1 and 2.

In each of the embodiments as shown in FIG. 1 and 2, it is preferable to have the measuring section M act as a shield for external influences such as light. In the embodiment in FIG. 2, it is of particular importance to have section M act as a shield, because upon alternating between positions 1 and 2, as prescribed by ADM, external influences for which the sensor S is sensitive, can contribute to the ADM signal in case the external influences act with different intensities on the sensor in each of the positions 1 and 2.

Although the description above is in the context of flow measurement, this presentation should not be construed as limiting the applicability of ADM but merely as providing illustration of a real-world application of ADM. Thus, the scope of ADM should be determined by the appended claims and their legal equivalents.

We claim:

1. Method of operation for elimination of drift in sensors with the property that each single measurement of a physical quantity S in a given medium is defined as the difference of the results of two partial measurements, said two partial measurements being made in succession by said sensor with different relative orientations between sensor and medium, said relative orientations corresponding to distinct sensitivities of said sensor to S.

2. Method of operation such as stated in claim 1 with the property that the two relative orientations between sensor and medium are obtained by alternating the orientation of said medium (with physical quantity S), keeping the orientation of said sensor fixed.

3. Method of operation such as stated in claim 1 with the property the two relative orientations between sensor and medium are obtained by alternating the position of the sensor in the medium (with physical quantity S), keeping the orientation of said medium fixed.

* * * * *